(12) United States Patent
Mitsch

(10) Patent No.: US 9,644,697 B2
(45) Date of Patent: May 9, 2017

(54) ECCENTRIC CLAMPING BUSHING

(75) Inventor: Franz Mitsch, Heppenheim (DE)

(73) Assignee: FM Energie GmbH & Co. KG, Heppenheim (DE)

(*) Notice: Subject to any disclaimer, the term of this patent is extended or adjusted under 35 U.S.C. 154(b) by 649 days.

(21) Appl. No.: 13/515,971

(22) PCT Filed: Dec. 15, 2010

(86) PCT No.: PCT/EP2010/007643
§ 371 (c)(1),
(2), (4) Date: Jun. 14, 2012

(87) PCT Pub. No.: WO2011/085773
PCT Pub. Date: Jul. 21, 2011

(65) Prior Publication Data
US 2012/0248285 A1    Oct. 4, 2012

(30) Foreign Application Priority Data

Dec. 21, 2009 (EP) .................................... 09015795

(51) Int. Cl.
| | |
|---|---|
| *F16M 1/00* | (2006.01) |
| *F16F 1/38* | (2006.01) |
| *F16F 1/02* | (2006.01) |
| *F16F 1/20* | (2006.01) |
| *F16F 1/18* | (2006.01) |
| *F16F 1/387* | (2006.01) |

(52) U.S. Cl.
CPC ............ *F16F 1/3863* (2013.01); *F16F 1/027* (2013.01); *F16F 1/187* (2013.01); *F16F 1/20* (2013.01); *F16F 1/38* (2013.01); *F16F 1/387* (2013.01); *Y10T 16/05* (2015.01); *Y10T 24/44034* (2015.01)

(58) Field of Classification Search
CPC .... F16F 1/027; F16F 1/187; F16F 1/20; F16F 1/38; F16F 1/40; F16F 3/093; F16F 15/046; F16F 15/085
USPC ...... 267/136, 140.4, 141.1, 141.2, 151, 152, 267/160, 182; 248/636, 610, 632, 634, 248/635, 638
See application file for complete search history.

(56) References Cited

U.S. PATENT DOCUMENTS

| | | | | |
|---|---|---|---|---|
| 2,069,270 | A | * | 2/1937 | Piron .......................... 267/140.5 |
| 2,126,707 | A | * | 8/1938 | Schmidt ..................... 267/140.5 |
| 2,233,110 | A | * | 2/1941 | Piron .......................... 267/140.5 |
| 2,267,312 | A | * | 12/1941 | Smith .......................... 267/282 |
| 3,083,065 | A | * | 3/1963 | Hinks et al. .................. 384/221 |
| 3,134,585 | A | * | 5/1964 | Trask ............................ 267/153 |

(Continued)

FOREIGN PATENT DOCUMENTS

| | | |
|---|---|---|
| DE | 1 033 047 | 6/1958 |
| DE | 1 955 308 | 11/1969 |

(Continued)

*Primary Examiner* — Kimberly Wood
(74) *Attorney, Agent, or Firm* — Davis & Bujold PLLC; Michael J. Bujold

(57) ABSTRACT

A clamping bushing which, due to the particular eccentric geometry and composite materials used to manufacture the same, comprising elastomers (14, 15) and metal sheets (10, 11), is suitable for the reduction of principally vertically acting vibrations and structure-borne sound which can arise in machines/gearboxes and, in particular, in wind turbines.

11 Claims, 5 Drawing Sheets

(56) References Cited

U.S. PATENT DOCUMENTS

Figure 1:
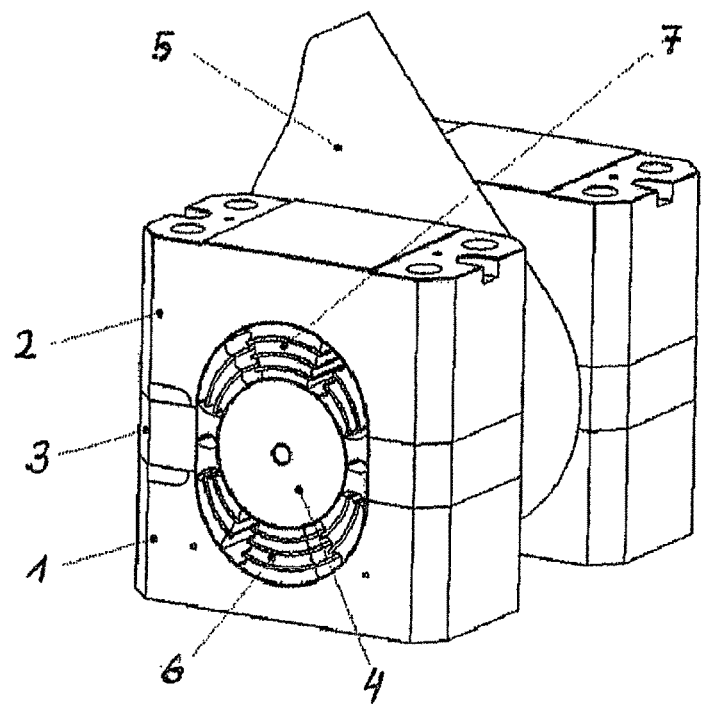

| | | | |
|---|---|---|---|
| 3,666,301 A | | 5/1972 | Jorn |
| 3,690,639 A | * | 9/1972 | Brandon et al. ............ 267/282 |
| 3,787,102 A | * | 1/1974 | Moran .................... 384/221 |
| 3,797,851 A | * | 3/1974 | Hirst ..................... 267/294 |
| 4,444,122 A | * | 4/1984 | Dickhart, III ............ 105/224.1 |
| 4,826,145 A | * | 5/1989 | Moore et al. ............. 267/293 |
| 6,659,438 B2 | * | 12/2003 | Michael et al. ........... 267/294 |

FOREIGN PATENT DOCUMENTS

| | | |
|---|---|---|
| DE | 28 11 034 | 9/1979 |
| DE | 29 924 608 U1 | 4/2004 |
| DE | 10 200 501 2751 A1 | 9/2006 |
| EP | 01 49 079 A2 | 7/1985 |
| EP | 1 046 832 A1 | 10/2000 |
| EP | 16 74 757 | 6/2006 |
| GB | 818 850 | 8/1959 |

\* cited by examiner

ECCENTRIC CLAMPING BUSHING

This application is a national stage completion of PCT/EP2010/007643 filed Dec. 15, 2010 which claims priority from European Application Serial No. 09 015 795.9 filed Dec. 21, 2009.

FIELD OF THE INVENTION

The invention describes a clamping bushing which, owing to its particular eccentric geometry and composite materials used, comprises individual segments of elastomers and metal sheets, and is suitable for the reduction of vibrations and structure-borne sound which arise in machines/gearboxes. The eccentric, or rotationally asymmetrical geometry of the clamping bushing in the un-tensioned state and also in the pre-tensioned state has the effect that, in particular, vertical vibrations are damped. Corresponding measures also enable high rigidity to be achieved at the same time in the horizontal plane transverse to the clamping bushing axle. The clamping bushings according to the invention are preferably installed in torque brackets of gearboxes and in this case especially in wind turbines.

BACKGROUND OF THE INVENTION

Wind turbines, like generally any driven system, have bearings between the driven components (motor/gearbox) and the static components (for example housing). Particular requirements are made of the bearings of wind turbines. The bearings must namely to a particular extent withstand high forces acting in different directions. Due to the irregularity of wind with respect to its strength and direction, which can change within a short time, forces of different strength continually occur in the tension, compression and transverse direction, which are greater the stronger the wind force and the larger the wind turbine. During storms or hurricanes, wind turbines must even withstand extreme loads. The components here must survive the loads without damage over a long operating time. In addition, the bearings of wind turbines have the task of reducing the noises due to the forces acting and generated by vibrations of the wind turbine.

The drive shaft of wind turbines is subjected to high forces and torques, which are transmitted to it by the rotor blades. In order that the drive shaft, and the parts connected to it, do not suffer from excessive material fatigue and become destroyed, they must be correspondingly supported on bearings. The bearings here must absorb and, if possible, neutralize or offset the forces and moments. The bearings must transmit forces in the radial z/y direction and be as soft as possible in the axial x direction in order to be able to compensate for the bearing play present in the pedestal bearing without major restoring forces. Three-point bearing systems are frequently used.

In a typical modern three-point bearing system of the prior art, the shaft carrying the rotor runs through a pedestal bearing and enters the gearbox. The gearbox block is connected to the bedplate on both sides of the gearbox block by means of the gearbox torque brackets. In general, a torque bracket is present on each side. The torque brackets have holes at their ends. The actual clamping bushings, through which is passed an axle, which is itself attached to two supports in front of and behind the torque brackets, are located in these holes or eyes. The axle can be screwed directly to the support, for example by means of radial screws.

Whereas the clamping bushing rests in the eye of the gearbox torque bracket, the axle is supported in the cylindrical cavity of the bushing. The bushing itself is made of materials which also have elastic properties and are thus capable of compensating for and cushioning the forces and moments.

The bushings, as undivided solid bushings, are pressed axially into the supports provided with holes or also, in the form of divided bushings, tensioned radially in horizontally divided supports.

However, there are also designs in the prior art in which a bushing bearing system is provided on both sides of the gearbox bracket. The clamping bushings in this variant are introduced into the two supports on both sides of the torque bracket. In accordance with the prior art, these are, as undivided solid bushings, pressed axially into the supports provided with holes (eyes) or, in the form of divided bushings, tensioned radially in horizontally divided supports.

DE OS 1 955 308 discloses bushings which consist of concentric, rubber-coated half shells and can be used for use as spring element or joint bushing having extremely large steering lock angles in relatively light vehicles.

EP 1 046 832 discloses cylindrical clamping bushings capable of being tensioned radially which are rotationally symmetrical in the tensioned state, consisting of correspondingly shaped half-shells lying one on the other. These each consist of cylindrical outer and inner shells with corresponding continuous elastomer/metal sheet/elastomer layers which are radially offset relative to one another so that they, or the full shell formed therefrom, are (is) eccentric in the un-tensioned state, but concentric or rotationally symmetrical after pre-tensioning.

These bushings, which were developed, in particular, for use in wind turbines in order to effect damping of arising vibrations, have, owing to their concentric geometry which is uniform in all directions, the disadvantage that they require a relatively large amount of space in all directions. However, the space available, especially in the horizontal plane, in gearbox bearing systems of wind turbines is very restricted. Since structure-borne sound in the wind turbines used arises principally through vertically directed vibrations, the damping systems must be designed to be correspondingly strong in this direction. For particularly good sonic properties, it is advantageous to have a relatively thick rubber layer in the direction of the solid-borne sound stimulation. In the rotationally symmetrical bushing of EP 1 046 832, the bushing would have to be larger in diameter, i.e. both in height and also in width, in order to improve the sonic properties. The supports or clamp halves would thus also have to be significantly widened, which results firstly in increased costs, greater weights, but also in stability problems in the upper half shell, meaning that the latter would have to be made significantly thicker owing to the greater bending moment given the greater clamping width. This in turn means that the space requirement in the horizontal direction is often not sufficient without corresponding modification measures having to be taken on the wind turbine.

The object was thus to develop a corresponding clamping bushing based on the clamping bushing of EP 1 046 832, which is effective per se, which on the one hand achieves improved damping or solid-borne sound decoupling in the vertical direction, but on the other hand requires a small or reduced space requirement in the horizontal direction.

SUMMARY OF THE INVENTION

The object has been achieved by the clamping bushing as described in greater detail in the claims and below.

The clamping bushings according to the invention furthermore, owing to their unusual geometry, experience uniform deformation after tensioning, which ensures a long service life of the elastomer employed.

BRIEF DESCRIPTION OF THE EMBODIMENTS

The clamping bushing according to the invention and its function are described in detail below with reference to the which shows:

FIG. 1: Attachment of a torque bracket by means of two clamp shoes with installed eccentric clamping bushings according to the invention in 3D view.

Figure 2:
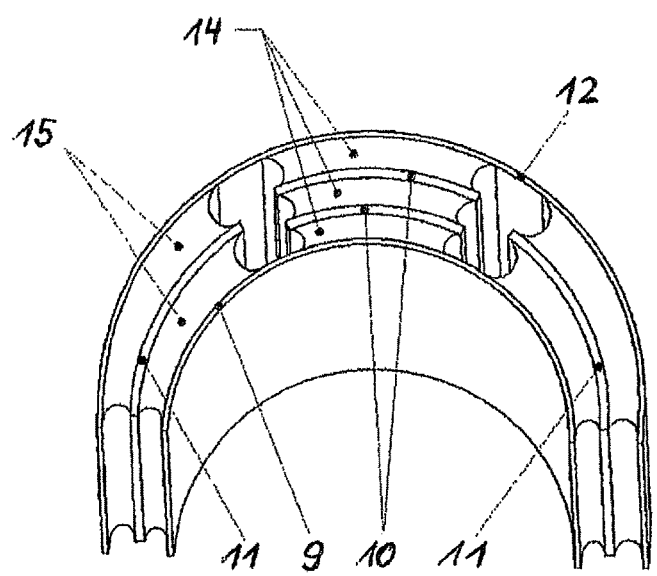

FIG. 2: 3D view of a half-shell element in accordance with the invention having a central segment comprising three elastomer layers (two intermediate metal sheets) and two lateral segments having two elastomer layers (one intermediate metal sheet).

Figure 3:
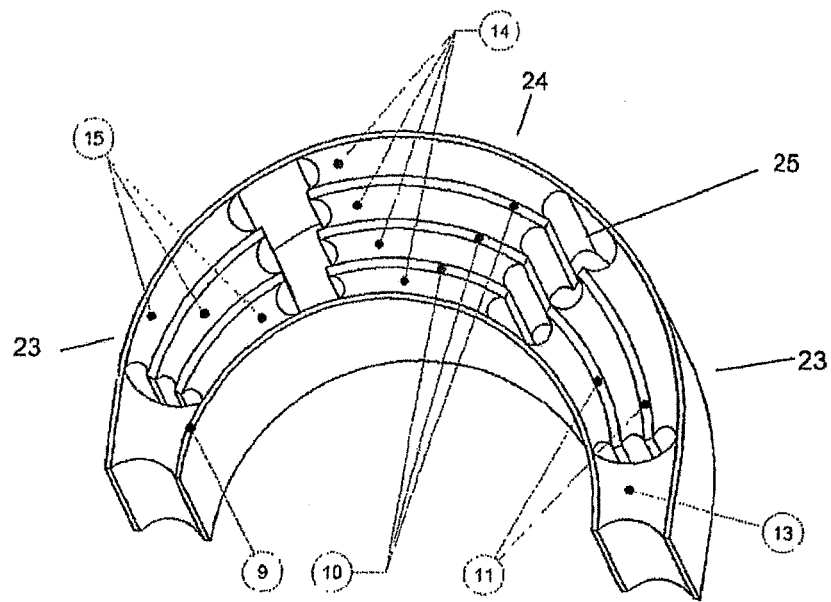

FIG. 3: 3D view of a half-shell element in accordance with the invention having one central segment comprising four elastomer layers (three intermediate metal sheets) and two lateral segments having three elastomer layers (two intermediate metal sheets).

Figure 4:
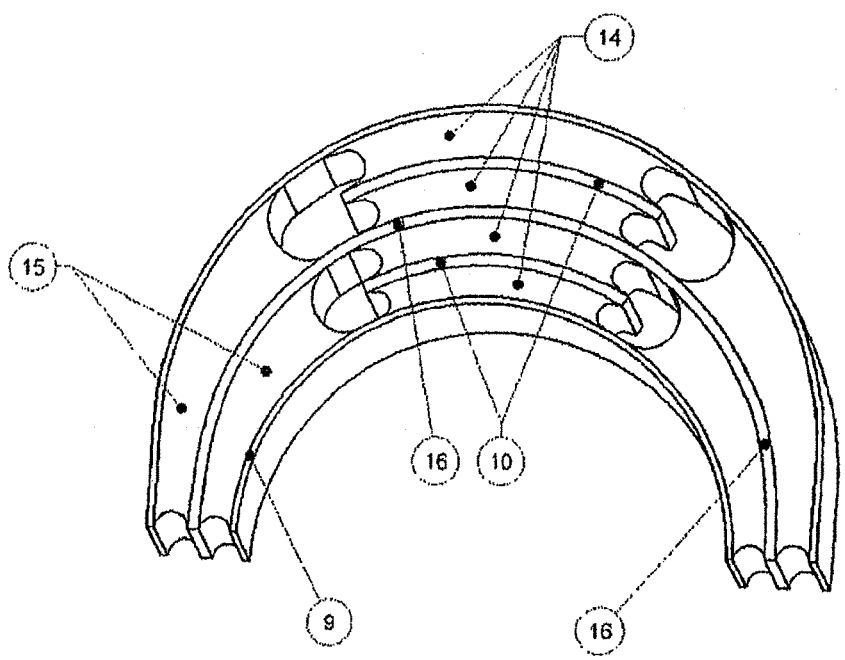

FIG. 4: 3D view of a half-shell element in accordance with the invention having one central segment comprising four elastomer layers (two intermediate metal sheets plus a continuous intermediate metal sheet) and two lateral segments having two elastomer layers (one continuous intermediate metal sheet).

Figure 5:
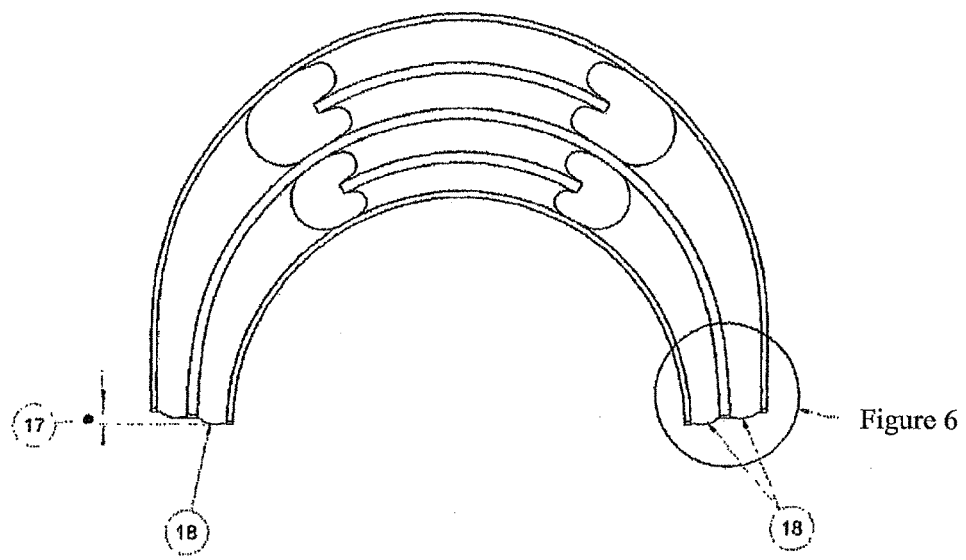

FIG. 5: Plan view (longitudinal section) of a half-shell element in accordance with the invention having a central segment comprising four elastomer layers (two intermediate metal sheets plus a continuous intermediate metal sheet) and two lateral segments having two elastomer layers (one continuous intermediate metal sheet). The outer shell is shorter than the inner shell by the pretension offset (17). The ends of the elastomer layers have pretension bulges (18).

Figure 6:
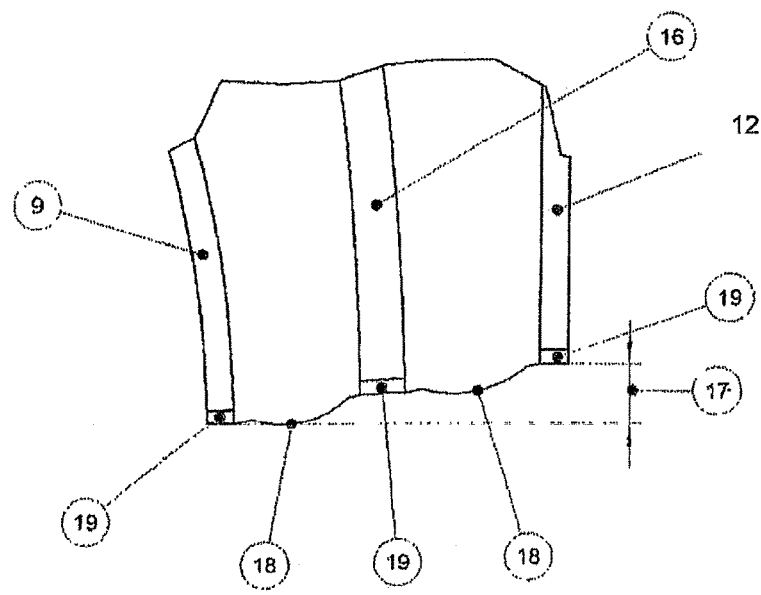

FIG. 6: Shows the right-hand end of the half shell from FIG. 5 in enlarged representation. The front faces of the outer, inner and intermediate metal sheets are covered with elastomer material.

Figure 7:
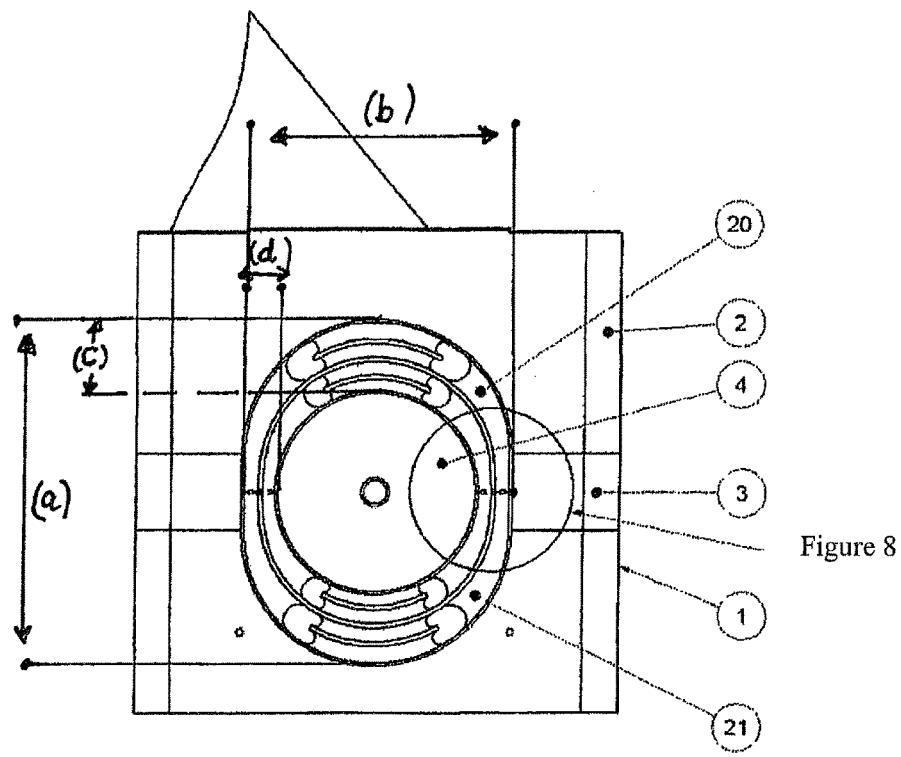

FIG. 7: shows a longitudinal section through a clamp shoe with closed gap at the separation surfaces of the half-shell elements due to the design according to FIG. 6.

Figure 8:
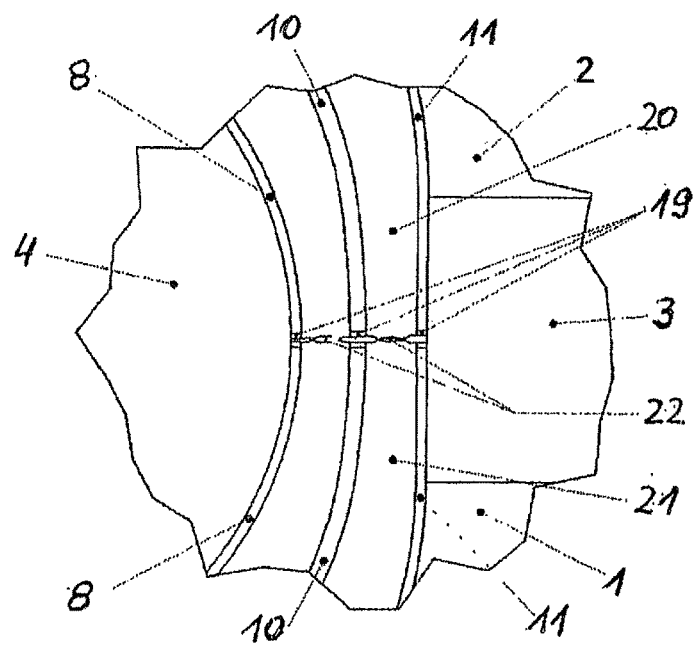

FIG. 8: shows the section marked in FIG. 7 in enlarged representation.

Figure 9:
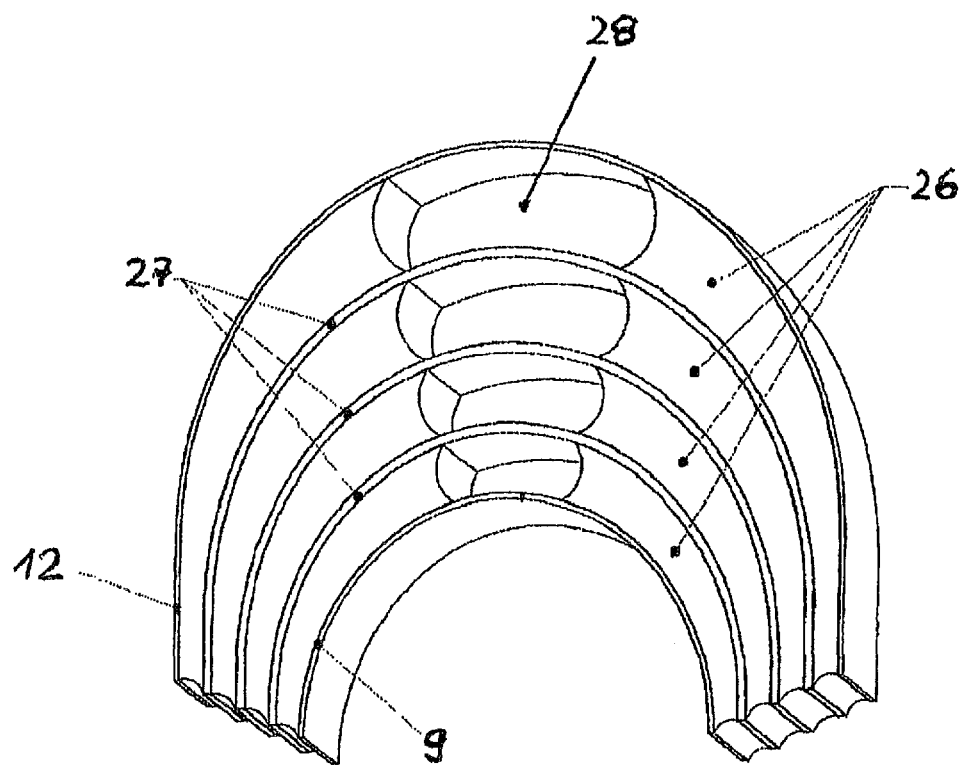

FIG. 9: shows a half-shell element in accordance with the invention having four elastomer layers in the lateral segments, which are separated from a central segment, which has elastomer-free layers (empty layers), and having three continuous intermediate metal sheets.

DETAILED DESCRIPTION OF THE EMBODIMENTS

In a first aspect of the invention, the eccentric bushings according to the invention have—provided that they are usually installed vertically—layer segments (23) arranged in the horizontal or lateral direction comprising elastomers and metal sheets, which have less damping in their overall effect than layer segments (24) which are arranged in the vertical or longitudinal direction and which are specifically responsible for vibration damping in this direction. It is thus achieved that the bushing experiences desired, significantly less damping in its horizontal extension than in the vertical direction. This effect thus arises if the total mass of the elastomer layers in the vertical direction is greater than that in the horizontal direction. However, the effect can also be achieved if, instead of more elastomer layers or mass, corresponding "soft" layers without elastomer (so-called empty layers) or layers comprising softer elastomers are provided in the vertical direction. The corresponding geometry of the bushings according to the invention, which is also eccentric in the tensioned state, supports this effect.

In a second aspect of the invention, this construction or design results in the requisite space in the horizontal direction being significantly smaller than in the vertical.

The clamping bushing according to the invention consists of two half-shell elements (6) (7) lying one on the other, which are eccentric due to their outer shape and which thus form an eccentric, rotationally asymmetrical full shell (FIG. 1). The outer shape of a half-shell element here is determined by the outer metal sheet (12). The latter is curved in the corresponding rotationally asymmetrical shape. The full shell thus has a contour which differs from the circular shape in longitudinal section (section through the vertical); the associated half shells (6) (7) accordingly likewise have a contour which differs from a semicircle. The preferred longitudinal section contour of the clamping bushing according to the invention is, in the case of the full shell, an oval or ellipse, whose longitudinal axis is preferably aligned vertically in the operating state. The half shells have the corresponding half shapes.

Furthermore, the geometry of the longitudinal section of the clamping bushing according to the invention may be composed of an upper and lower circular or oval arc element, which are connected to one another by a central rectangle or square. This means that the outer contour of the clamping bushing can, besides round elements at the top and bottom, also have straight surfaces at the sides.

In the case of the geometry described, the radius of the eccentrically curved outer metal sheet (12) of the clamping bushing or also of the relevant half-shell elements is thus smaller in the horizontal extension than in the vertical extension. In practice and in the case of the use of such bushings according to the invention in wind turbines, a typical bushing according to the invention has, for example, an outer diameter in the long direction (a) of about 350-380 mm and an outer diameter in the transverse direction (b) of 280-300 mm, or in other words and expressed independently of the size, the longitudinal diameter transverse diameter ratio ((a)/(b)) of an eccentric full bushing of this type varies between 1.20 and 1.50, preferably between 1.3 and 1.4.

The layer thickness (c) of a bushing or also half bushing according to the invention in the vertical direction is at the thickest (central) point about 70-90 mm, while the layer thickness in the horizontal direction (d) experiences its narrowest extension at the height of the separation plane, where it is about 30-50 mm thick. The (c)/(d) ratio is thus on average about 2:1.

The invention thus relates to a corresponding eccentric bushing in which the ratio of the layer thickness of the half bushing in the vertical direction (c) to the layer thickness of the half bushing in the horizontal direction (d) is 1.5 to 2.5 (c/d), preferably 2.

The invention thus also relates to a corresponding eccentric bushing in which the ratio of the outer diameter of the full bushing in the vertical direction (a) to the outer diameter of the full/half bushing in the horizontal direction (b) is 1.2 to 1.4 or 1.5.

The preferred clamping bushings in accordance with the invention thus have a layer thickness ratio (a)/(b) of 1.5 to 2.5, preferably about 2, and a ratio of the outer diameter in the vertical direction (c) to the outer diameter in the horizontal direction (d) of about 1.2 to 1.4.

The metal sheets are, in accordance with the invention, between 2 and 8 mm thick, depending on the size and requisite loading capacity, where the central or intermediate metal sheets are preferably the same or thinner or thicker, but preferably thicker, than the outer metal sheets. The bearing eye, which has to accommodate the bushing axle (4), has, in accordance with the invention, a diameter between 100 and 280 mm, in particular between 180 and 240 mm.

Each half-shell element (6) (7) has an outer metal sheet (12) determining the eccentric shape of the shell and an inner metal sheet (9), which is semi-circular in longitudinal section, so that, when the half shells are joined together, a cylindrical cavity shaped by the inner metal sheets (9) of the half shells is formed in the diameter of the clamping-bushing axle (4) for accommodation thereof.

The outer metal sheet (12), shaped in accordance with the outer contour, of a half shell is connected to the inner cylindrical metal sheet (9) via at least one elastomer layer (14) (15). In accordance with the invention, a half shell of this type comprises three regions: two lateral or horizontally aligned segments (23), which have at least two elastomer layers and at least one intermediate metal sheet, and a central vertically aligned segment (24) (28), which has free or more elastomer layers and/or empty layers. The number of elastomer layers (14) of a half shell may, in accordance with the invention, be greater in the center (vertically) than the number or alternatively also equal to the number of elastomer layers (15) laterally at the two edges of a half shell (the same also applies to any intermediate metal sheets employed). The shells usually have three, four or more elastomer layers (14) in the vertical direction or centrally, which are in each case separated from one another by an intermediate metal sheet (10). Accordingly, the half shells have at their edges (horizontally) equally many or fewer elastomer layers (15), which are separated from one another by intermediate metal sheets (11). The two metal sheets (12) and (9) which form the half-bushing body are connected to one another laterally at their edges, which form the separation plane of the two half shells lying one on top of the other, by at least one elastomer layer (13), but preferably by at least two elastomer layers (15), which are separated by intermediate metal sheets.

In a simple, particular embodiment of the invention, the layers in the vertical direction have at least one empty layer, i.e. a layer which has no filling with elastomer material. In this embodiment, the vertical layers are preferably all empty layers.

The layer segments (24) (28) can in principle all be elastomer layers, can all be empty layers or are preferably alternately elastomer/and empty layers. The elastomer layers here may also have the same or lower Shore hardness than the elastomer layers of the lateral/horizontal layer segments (23).

The shape of the elastomer layers and of the intermediate metal sheets depends on the shape or contour of the outer (12) and inner (9) limiting metal sheet, where, for a certain half shell having a pre-specified shape, the intermediate layers/metal sheets are preferably based on the shape/contour of the limiting metal sheet which is closest to them.

The invention thus relates to an eccentric clamping bushing (8) comprising an upper (7) and lower (6) half-shell element, which, lying one on the other, form a full shell which has, in longitudinal section, an oval, ellipse-like or arc-shaped/rectangular contour, whose long axis is aligned perpendicular to the surface of the two half-shell elements (6) (7) lying one on the other, where each of these shell elements is composed of an outer half-shell metal sheet (12) having the longitudinal section contour and an inner half-shell metal sheet (9), where the latter has a semi-circular contour in longitudinal section and, when laid one on top of the other together with the inner identical half-shell metal sheet of the other half-shell element, forms a cylindrical cavity, which accommodates the clamping-bushing axle (4) and tightly surrounds the latter after the half-shell elements have been joined together to form the complete clamping bushing (8) and tensioning thereof, so that the outer (12) and inner (9) half-shell metal sheet of each half-shell element (6) (7) are firmly connected to one another by two lateral layer segments (23) and a central layer segment (24), which are shaped analogously to the half-shell element, where (i) the lateral segments (23) comprise alternately elastomer layers and intermediate metal sheets with at least two elastomer layers (15) and one intermediate metal sheet (11), (ii) the central segment (24) comprises alternately elastomer layers or empty layers and intermediate metal sheets (10) (27) with at least three elastomer layers (14) or empty layers (28) and two intermediate metal sheets (10) (27), (iii) the ratio of the outer diameter of the full bushing composed of two half shells arranged one above the other in the vertical direction (a) to the outer diameter of the half or full bushing in the horizontal direction (b) is 1.2 to 1.5, so that the radius of the outer half-shell metal sheet (12) and thus of the clamping bushing (8) in the horizontal extension is smaller than in the vertical extension, and (iv) the ratio of the layer thickness in the center of the half bushing in the vertical direction (c) to the layer thickness at the front face of the half bushing in the horizontal direction (d) is 1.5 to 2.5, so that each half shell and also the full shell is eccentric with respect to the bushing axle (4), both in the un-tensioned and pre-tensioned state.

In particular, the invention relates to an eccentric clamping bushing (8), where each half shell comprises two layer segments (23) with three elastomer layers (14) aligned vertically or centrally, or in the longitudinal direction, which are separated from one another by two intermediate metal sheets (10), and a centrally arranged layer segment (24) (28) with two or three lateral elastomer layers (13, 15) located at both edges of a half shell, which are separated from one another by an intermediate metal sheet (11) (FIG. 2).

The invention furthermore relates to an eccentric clamping bushing (8), where each half shell comprises two layer segments (23) with four elastomer layers (14) aligned vertically or centrally, or in the longitudinal direction, which are separated from one another by three intermediate metal sheets (10), and a centrally arranged layer segment (24) (28) with two, three or four lateral elastomer layers (13, 15) located at both edges of a half shell, which are in each case thus separated from one another by two or more intermediate metal sheets (FIGS. 4, 5, 7, 9).

As described above, the half-shell elements (7) and (8) of the non-circular eccentric clamping bushing according to the invention have correspondingly shaped layers of elastomers and layers of metal sheets. Since larger amounts of elastomer material have to be compressed when the bushing is tensioned by corresponding tensioning means, space must be present in each shell element in order that the rigidity in the preferred vertical direction does not become excessive and thus the desired damping or sound decoupling does not become inadequate, where this space can be occupied by elastomer material located between two metal sheets and forced out. The individual layers of metal sheets and elastomer thus do not occupy the entire interior of each half-shell element (7) (6), but instead these bushing elements comprise different segments (23) (24), formed from the elastomer/metal sheet layers, which extend between the outer metal sheet (12) and the inner metal sheet (9) of a half-shell element and fill this space. The individual segments are separated from one another in the region of opposite elastomer layers by separating line windows (25), which likewise extend between the metal sheets (12) (9). These separating line windows facilitate the uptake of elastomer forced out between the metal-sheet layers when the half-shell elements are tensioned against one another. By variation of the width of the layers and the size of the bushing, or the longitudinal elongation (vertically) thereof in relation to the transverse elongation (horizontally) in the operating state, the desired damping properties can thus be adjusted over a large range. Furthermore, elastomer material of different damping in the vertical and horizontal segments can act on the damping properties in the desired sense. Each half-shell element (6) (7) has, in accordance with the invention, three or more, preferably three, of the described segments (23) (24), which are distributed at a certain separation between the limiting surfaces comprising metal sheet (12) (9). The segments comprising elastomer and metal-sheet layers preferably have at their edges concave recesses in the elastomer layer, which, together with the space between the segments, form the separating line windows (25), which are partially or fully filled with elastomer material pressed in when the bushing is tensioned.

In accordance with the invention, each half shell has two lateral/horizontal segments (23), which terminate the curved half shell and essentially forms the separation plane to the other half shell in such a way that the front faces of the elastomer layers and of the metal sheets of the upper (7) and lower (6) half-shell element come to lie on one another.

In accordance with an embodiment of the invention, the front faces of the elastomer layers, directed towards the separation plane, of each shell have concave recesses. In these cases, the outer metal sheet (12) and the inner metal sheet (9), forming the cylindrical cavity, extend to an equal extent as far as the separation plane of the half-shell elements. In order to make the bushings stiffer in the horizontal direction transverse to the axle (4), the separating line windows must be completely or at least substantially closed by elastomer material.

Besides the two lateral segments (23) described, each half shell has one or more, preferably one, central/vertical segment (24) (vertical to the axle (4)), which has to do the actual damping work occurring vertically to the axle (4). As already noted at the outset, the number of elastomer layers/metal sheets/elastomer layers in this central segment (24) is, in accordance with the invention, greater than in the two lateral, horizontally aligned segments (23), enabling the inventive effect described to be achieved for the first time. The central segment can have three, four, five, six or more elastomer layers (14) and a corresponding number of intermediate metal sheets (10), while the two lateral segments (23) have at least one elastomer layer (15) or intermediate metal sheet (11) fewer. However, the central segment may also be an "empty segment" with "empty layers", i.e. a segment which has only some or no elastomer layers at all.

Each of the preferably three segments (23) (24) of a half shell or half bushing occupies about ⅓ of the volume of a half bushing. The two lateral/horizontally arranged segments (23) together can occupy 60-80% of the volume, while the central region (24) occupies 20-40% of the volume. By varying these geometric parameters, the damping property of the eccentric bushing can likewise be modified.

The invention in accordance with these features also serves, in particular, to enable installation of softer bushings in existing wind turbines without having to carry out major design changes. However, it is also suitable for simply constructing the bushings narrower in new designs and nevertheless making them in a greater height. The bushing thus retains optimum solid-borne sound properties with a significantly smaller physical size, which results in the saving of material, in particular for the clamp halves (1) and (2), which are necessary for the attachment of the bushings.

A typical central/vertical segment (24) in accordance with the invention is formed from three elastomer layers (14) and two intermediate metal sheets (10). Another typical central segment (24) is formed from four elastomer layers (14) and three intermediate metal sheets (10). A further typical central segment (24) is formed from five elastomer layers (14) and four intermediate metal sheets (10).

Accordingly, a typical upper (7) or lower (6) half-shell of the invention has (i) a central/vertical segment (24) which is composed of three elastomer layers (14) and two intermediate metal sheets (10), and (ii) two lateral/horizontal segments (23) in which each is composed of at least two elastomer layers (15) and one intermediate metal sheet (11).

Another typical upper (7) or lower (6) half-shell of the invention has (i) a central/vertical segment (24) which is composed of four elastomer layers (14) and three intermediate metal sheets (10), and (ii) two lateral/horizontal segments (23) in which each is composed of one, two or three elastomer layer(s) (15) and no, one or two intermediate metal sheet(s) (11).

A further typical upper (7) or lower (6) half-shell of the invention has (i) a central/vertical segment (24) which is composed of five elastomer layers (14) and four intermediate metal sheets (10), and (ii) two lateral/horizontal segments (23) in which each is composed of one, two, three or four elastomer layer(s) (15) and no, one, two or three intermediate metal sheet(s) (11).

A further typical upper (7) or lower (6) half-shell of the invention has (i) a central/vertical segment (24) which is composed of four empty layers (14) and three intermediate metal sheets (10), and (ii) two lateral/horizontal segments (23) in which each is composed of one, two, three or four elastomer layer(s) (15) and no, one or two or three intermediate metal sheet(s) (11).

In a particular embodiment, the central segment consists of three or four empty layers (28). The half shell in this case has two or three continuous intermediate metal sheets (27), which stabilize the central segment (24).

In a further embodiment, the central/vertical segment (24) consists of four layers, where elastomer layers and empty layers alternate. The lateral segments (23) in this embodiment preferably each consist of three or four elastomer layers.

The number of elastomer layers and metal sheets also depends on the size and thickness of the clamping bushing.

In the case of relatively large bushings having corresponding longitudinal and transverse diameters, it may become necessary to stabilize these in order that no irreversible deformations of the bushing occur during tensioning. This problem is solved in accordance with the invention by the introduction of an intermediate metal sheet (16) which passes through the half shell (6) (7) (FIGS. 4, 5, 7), and preferably divides the space formed by the metal sheets (12) and (9) centrally and accordingly, where appropriate, replaces the intermediate metal sheet (10) (11) in the lateral segments (23) and the central segment(s) (24). As depicted in FIGS. 4 and 7, this continuous metal sheet (16) may be the only intermediate metal sheet of the lateral segments (23). This thus prevents buckling in the case of relatively high loads and/or pretensioning forces.

Half bushings according to the invention which have empty layers in the central segments comprise, as intermediate metal sheets, at least one continuous intermediate metal sheet (16) (27). Preferably, all intermediate metal sheets here are continuous.

In another embodiment, the outer metal sheet (12) determining the shape of the bushing is shorter than the inner metal sheet (9) and thus does not extend as far as the separation plane. A pretension offset (17) of between about 1 and 5 mm, corresponding to the size of the bushings employed, thus arises in relation to the separation plane. By tensioning the clamping bushing, the outer shell metal sheet (12) of each half shell is pressed as far as the separation plane (apart from a tolerance deviation), with corresponding elastomer material being moved at the same time. In order to compensate for the tolerances even better, the ends of the layers can have projecting elastomer in the form of a pretension bulge (18). This closes the gap formed by tolerances. FIGS. 7 and 8 show this for the tensioned state.

Since the tolerance in the elastomer part is easier to produce than on the metal-sheet shells, the latter are covered on the front face with elastomer (19) in a thickness of about 1-3 mm. Furthermore, this layer is elastic and is thus better able to adapt to given tolerances than would be the case for the metal sheets (9) (12) (11) (10) and (16). Excess material is thus at the same time forced away torsionally in the layer with low shearing force. Since the bushing is sealed off at the separation point on the inside by the axle (4) and on the outside by the spacer (3) (as part of the clamp shoe (1) (2)), the excess elastomer remains within the layer in the case of a narrow gap due to the tolerance and is distributed therein. This embodiment of the invention is described for a clamping bushing (8) having two horizontal layers and four vertical layers. However, it can also be used for all layer combinations listed above.

The invention thus also relates to a corresponding clamping bushing in which the outer metal sheet (12) of a half shell is shorter than the inner metal sheet (9), and a pre-tension offset (17) is thus formed in the un-tensioned state of the clamping bushing, and furthermore the elastomer layers (15) of the lateral segments adjacent to the separation plane of the two half shells are in the form of a convex bead (18) at their ends facing the separation plane, so that, when the bushing is pre-tensioned, the pre-tension offset (17) approaches zero, meaning that outer, inner and any intermediate metal sheets are kept apart by the compressed elastomer material located between them, and increased horizontal rigidity directed transversely to the bushing axle (4) is thus achieved.

The clamping bushing (8) according to the invention is located, as depicted in FIGS. 1 and 8, in a clamp shoe, which comprises an upper (2) and lower (1) clamp half. The clamp halves have recesses which have the same geometrical (curved) contour as the outer half-shell elements (7) (8), so that these can be accommodated in a flush manner. The clamp halves preferably do not extend down as far as the separation plane of the two shell halves in order to ensure easier installation and removal. In this case, the clamp shoe additionally comprises a spacer (3), which, after installation of the clamping bushing according to the invention into the upper or lower clamp half, is pushed between the two clamp halves. The spacers, as loose additional parts, can be attached as a complete assembly to one clamp half or in each case as half assemblies to the clamp halves (1) (2). This is particularly advantageous in the case of retrofitting of existing wind turbines in order to improve sound transmission.

In a simple embodiment, the clamp halves are extended, so that they reach as far as the separation plane of the half-shell elements. Installation, removal and modification of the bushings according to the invention is possible, but more difficult, in this variant.

The tensioning of the clamp shoe with inserted clamping bushing (8) is carried out by clamping devices. For example, this can be carried out via clamping screws, which are inserted into corresponding holes vertically through the clamp halves and any spacers.

Two clamp shoes, each with a clamping bushing (8) according to the invention, usually serve for attachment of a gearbox torque bracket (5) in accordance with FIG. 1. The axle (4) here is passed through a corresponding hole in the torque bracket, and a corresponding clamp shoe with a clamping bushing (8) according to the invention is located on the left and right thereof. The clamp shoes are attached, generally screwed, to the bedplate.

The invention thus also relates to a clamp shoe comprising a lower (1) and upper (2) clamp half, which surrounds the clamping bushing (8) and the bushing axle (4), which is passed centrally through the latter and is connected to the torque bracket (5), where the clamp halves are tensioned against one another by clamping means and thus pretension the clamping bushing, so that the vibrations of the machine parts attached to the torque bracket (5), which occur predominantly in the longitudinal direction of the clamping bushing vertically to the axle (4), are damped.

The metal sheets of the half-bushing elements (7) and (8) are preferably made from hard, resistant, but generally not excessively brittle materials. These are preferably metals or metal alloys, but can also in individual cases be hard plastics, ceramic materials or carbon fibres, or additionally comprise these substances. Suitable metals which may be mentioned are, in particular, iron and steels, chromium/vanadium steels, light metals, such as, for example, aluminum, titanium, zirconium or tantalum, or also alloys which comprise these metals. Iron sheets are preferably used.

The elastomers used for the clamping bushings according to the invention, if desired with different hardness, are known from the prior art and are adequately described in the relevant literature. Commercially available natural rubbers or plastics are preferably employed. Examples of suitable elastomers are: natural rubber, isoprene, butadiene, polynorbornene, chloroprene, styrene-butadiene, butyl, ethylene-propylene, nitrile, polyurethane, acrylate, ethylene-acrylate, silicone or fluorinated rubbers or plastics. The elastomer materials used for this invention preferably essentially consist of a natural rubber, a natural rubber derivative or of a suitable elastic polymeric plastic or plastic mixture. The elastomer layer may in accordance with the invention have different hardness ("Shore hardness") and different damping properties, in accordance with the desired requirements. Elastomers having a hardness of 20 to 100 Shore, in particular 40 to 80 Shore, are preferably used. The preparation of elastomers of different hardness is adequately described in the prior art. The use of elastomers having different hardness in the different (central or lateral) segments likewise enables the requisite different (vertical/horizontal) damping to be influenced.

The clamping bushings and clamp shoes according to the invention were developed for use in wind turbines in order to reduce or eliminate the vibrations occurring therein and noises generated by vibrations. However, they are also suitable for use in other machine/gearbox installations in which similar vibration problems occur.

Description of the reference numerals:

| | |
|---|---|
| 1 | Clamp half lower |
| 2 | Clamp half upper |
| 3 | Spacer |
| 4 | Bushing axle (connection to torque bracket) passed through bearing eye (20) |
| 5 | Gearbox torque bracket |
| 6 | Lower half-shell element |
| 7 | Upper half-shell element |
| 8 | Clamping bushing (consisting of two half shells) |
| 9 | Inner metal sheet |
| 10 | Intermediate metal sheet central/vertical segment |
| 11 | Intermediate metal sheet lateral/horizontal segment |
| 12 | Outer metal sheet |
| 13 | Elastomer layer edge |
| 14 | Elastomer layer central segment |
| 15 | Elastomer layer lateral segment |
| 16 | Intermediate metal sheet passing through the half bushing |
| 17 | Pretension offset |
| 18 | Pretension bulge comprising elastomer |
| 19 | Elastomer coating front face metal sheets |
| 20 | Bearing eye for accommodation of the bushing axle (4) |
| 23 | Layer segment lateral (horizontal alignment) |
| 24 | Layer segment central (vertical alignment) |
| 25 | Separating line window |
| 26 | Elastomer layer lateral segment in embodiment of FIG. 9 |
| 27 | Intermediate metal sheets running through the half bushing |
| 28 | Empty layers of the central (vertical) segment |
| a | Thickness of the half shell in vertical direction - central (greatest thickness) |
| b | Thickness of the half shell in horizontal direction - lateral (smallest thickness) |
| c | Outer diameter of the bushing (8) in longitudinal direction (vertical to axle (4)) |
| d | Outer diameter of the bushing (8) in transverse direction |

The invention claimed is:

1. An eccentric clamping bushing (8) having an eccentric geometry in a tensioned state and which supports a clamping-bushing axle that defines a central axis, the clamping bushing comprising:

upper (7) and lower (6) half-shell elements which are arcuate and have ends that abut each other to form a full shell, and in a cross sectional view of the full shell, the full shell has an oval-shaped outer contour, and is aligned along a vertical axis and a horizontal axis, each of the upper and the lower half-shell elements comprising, with respect to the central axis, a radially outer half-shell metal sheet (12) and a radially inner half-shell metal sheet (9), and ends of the inner and the outer half-shell metal sheets of the upper half-shell element abut respective ends of the inner and the outer half-shell metal sheets of the lower half-shell element, in the cross sectional view of the full shell, the inner half-shell metal sheets (9) of the upper and the lower half-shell elements each have a semi-circular contour such that the inner half-shell metal sheets of the upper and the lower half-shell elements form a cavity having a circular cross section, the clamping-bushing axle (4) is received within the cavity and mates with the inner half-shell metal sheets of the upper and the lower half-shell elements, each of the upper and the lower half-shell elements (6, 7) comprises two arcuate lateral layer segments (23) and an arcuate central layer segment (24), the two lateral layer segments and the central layer segment are arranged in the respective upper and the lower half-shell elements such that, in the cross sectional view of the full shell, the central layer segment is aligned along the vertical axis between the two lateral layer segments, the two lateral layer segments (23) of each of the upper and the lower half-shell elements comprise at least two elastomer layers (15) and at least one intermediate metal sheet (11) which, in the cross sectional view of the full shell, are radially, alternately layered such that the at least one intermediate metal sheet of the respective two lateral layer segments is radially layered between the at least two elastomer layers of the respective two lateral layer segments, the central layer segment (24) of each of the upper and the lower half-shell elements comprising at least first, second and third arcuate empty layers (28), and at least two intermediate metal sheets (10, 27) which, in the cross sectional view of the full shell, are radially, alternately layered with each other, the first empty layer has an arc length that is greater than a radial thickness of the first empty layer, in the cross sectional view of the full shell, the full shell has a vertical outer diameter, that is delineated along the vertical axis from a top of the upper half-shell element to a bottom of the lower half-shell element, and a transverse outer diameter, that is delineated from an exterior left side of the full shell along the horizontal axis to an exterior right side of the full shell, a ratio of the vertical outer diameter to the transverse outer diameter is 1.2 to 1.5, and, in the cross sectional view of the full shell, a distance from the central axis along the horizontal axis to the outer half-shell metal sheets (12) of the upper and the lower half-shell elements is smaller than a distance from the central axis along the vertical axis to the outer half-shell metal sheets of the upper and the lower half-shell elements, and in the cross sectional view of the full shell, the central layer segments of the upper and the lower half-shell elements, respectively, have a vertical thickness (c) that is delineated along the vertical axis between the outer and the inner half-shell metal sheets thereof, and each of the two lateral layer segments of the upper and the lower half-shell elements has a lateral thickness (d) that is delineated along the horizontal axis between the outer and the inner half-shell metal sheets thereof, and a ratio of the vertical thickness to the lateral thickness is 1.5 to 2.5, such that, in the cross sectional view of the full shell, the full shell has the oval-shaped contour both in an un-tensioned and the tensioned state.

2. The clamping bushing according to claim 1, wherein the central segment (24) has a fourth arcuate empty layer.

3. The clamping bushing according to claim 1, wherein an arc length of the second and the third empty layers of the central segment (24) is greater than a radial thickness of the respective second and third empty layers.

4. The clamping bushing according to claim 1, wherein the central layer segment (24) of each of the upper and the lower half-shell elements occupies between 20-40% of the respective upper and the lower half-shell elements by volume and has at least the first, the second, and the third empty layers (28) and, when viewed in the cross section, an arc length of each of the second and the third empty layers of the central layer segment is greater than a radial thickness of the second and the third empty layers, respectively.

5. The clamping bushing according to claim 4, wherein the central layer segment (24) of each of the upper and the lower half-shell elements occupies about ⅓ of the respective upper and the lower half-shell elements by volume and further comprises a third intermediate metal sheet and a fourth arcuate empty layer (28).

6. The clamping bushing according to claim 1, wherein a total number of the at least two elastomer layers (15) and the intermediate metal sheets (11) of the lateral layer segments (23) of the upper and the lower half-shell elements is equal to a respective total number of the first, second, and third arcuate empty layers (14, 28) and the intermediate metal sheets (10, 27) of the central layer segments of the upper and the lower half-shell elements.

7. The clamping bushing according to claim 1, wherein, when viewed in the cross section, opposite end surfaces of the at least two elastomer layers (15) of the two lateral layer segments (23) of each of the upper and the lower half shell elements are curved, in a concave manner, at opposed ends thereof facing a separation plane of the upper and the lower half-shell elements, the separation plane being defined by the horizontal axis and the central axis.

8. The clamping bushing according to claim 1, wherein at least one of the at least two intermediate metal sheets of the central layer segment and the at least one intermediate metal sheet of the two lateral layer segments of at least one of the upper and the lower half-shell elements (6, 7) is a continuous metal sheet that spans from one of the ends of the at least one of the upper and the lower half-shell elements to the other one of the ends of the at least one of the upper and the lower half-shell elements, the at least one continuous intermediate metal sheet connects all of the lateral and the central layer segments of the at least one of the upper and the lower half-shell elements with one another.

9. The clamping bushing according to claim 1, wherein the central layer segments (24) of the upper and the lower half-shell elements each have the first, the second, the third and a fourth empty layer (28) and each of the lateral layer segments (23) of the upper and the lower half-shell elements has a total of four elastomer layers (15), where the first, the second, the third and the fourth empty layers and the four elastomer layers (28, 15) in the respective central and the lateral layer segments are separated from one another by a total of three intermediate metal sheets (27) passing through the central and the lateral layer segments.

10. The clamping bushing according to claim 1, wherein the clamping bushing is vertically aligned along the vertical axis in an installed state, and the central layer segments of the upper and the lower half-shell elements are vertically aligned along the vertical axis and the lateral layer segments of the upper and the lower half-shell elements are horizontally aligned.

11. An eccentric clamping bushing, having an eccentric geometry in a tensioned state, for supporting a bushing axle, the clamping bushing comprises:

two shell elements consisting of an arcuate upper half-shell element and an arcuate lower half-shell element which abut each other to form a full shell, each of the upper and the lower half-shell elements comprises an inner metal sheet and an outer metal sheet and each of the inner and the outer metal sheets has two end faces, and in an un-tensioned state of the full shell, the upper and the lower half-shell elements communicate such that the two end faces of the inner metal sheets abut each other and the two end faces of the outer metal sheets are spaced from each other, and in a pre-tensioned state of the full shell, the two end faces of the inner metal sheets abut each other and the two end faces of the outer metal sheets abut each other, the inner metal sheets have a semi-circular contour and the outer metal sheets have an arcuate contour such that when the full shell is viewed in cross section, the inner metal sheets form a passage that has a circular contour and the outer metal sheets form an oval contour, the passage receives and mates with the clamping-bushing axle, the upper half-shell element has two lateral layered segments and a central layered segment that spaces the two lateral layered segments thereof from each other, and the lower half-shell element has two lateral layered segments and a central layered segment that spaces the two lateral layered segments thereof from each other, and, when the full shell is viewed in cross section, the central layered segments of the upper and the lower half-shell elements are aligned along a vertical axis, the inner and the outer metal sheets of the upper half-shell element are fixed to the two lateral layered segments thereof, and the inner and the outer metal sheets of the lower half-shell element are fixed to the two lateral layered segments thereof, and, when the full shell is viewed in cross section, the two lateral and the central layered segments are shaped analogously to the upper and the lower half-shell elements and fill a radial space between the outer and the inner metal sheets, the lateral layer segments of the upper and the lower half-shell elements comprising at least three elastomer layers and two intermediate metal sheets, and when the full she is viewed in cross section the two intermediate metal sheets and the at least three elastomer layers are radially, alternatively arranged with each other, the central layer segments of the upper and the lower half-shell elements comprising at least first, second and third arcuate empty layers and two intermediate metal sheets, and when the full shell is viewed in cross section the first, the second and the third empty layers and the two intermediate metal sheets are radially, alternatively arranged with each other, the first empty layer has an arc length that is greater than a radial thickness of the first empty layer, the second empty layer has an arc length that is greater than a radial thickness of the second empty layer, and the third empty layer has an arc length that is greater than a radial thickness of the third empty layer, the full shell having a vertical outer diameter that, when the full shell is viewed in cross section, is delineated along the vertical axis by a top side of the outer metal sheet of the upper half-shell element to a bottom side of the outer metal sheet of the lower half-shell element, and a horizontal outer diameter that is delineated along the horizontal axis by a right side of the outer metal sheet of one of the upper and the lower half-shell elements and a left side of the outer shell of the corresponding one of the upper and the lower half-shell elements, and a ratio of the vertical outer diameter to the horizontal outer diameter is 1.2 to 1.5, each of the upper and the lower half-shells has a vertical thickness that is, when the full shell is viewed in cross section, delineated along the vertical axis by the inner and the outer metal sheets of either the upper or the lower half-shell elements and a horizontal thickness that is, when the full shell is viewed in cross section, delineated along the horizontal axis by the inner and the outer metal sheets of either of the upper or the lower half-shell elements, and a ratio of the vertical thickness to the horizontal thickness is 1.5 to 2.5, and each of the upper and the lower half-shell elements and the full shell is eccentric with respect to the longitudinal axis and the clamping-bushing axle, in both the un-tensioned and the tensioned state of the clamping bushing.

* * * * *